(12) United States Patent
Pryce et al.

(10) Patent No.: US 10,267,439 B2
(45) Date of Patent: Apr. 23, 2019

(54) HOSE FOR CONVEYING FLUID

(71) Applicant: Icon Polymer Group Limited, Retford (GB)

(72) Inventors: Timothy Denzil Pryce, Sheffield (GB); Calvin Tan, Glasgow (GB)

(73) Assignee: Icon Polymer Group Limited, Retford (GB)

( * ) Notice: Subject to any disclaimer, the term of this patent is extended or adjusted under 35 U.S.C. 154(b) by 55 days.

(21) Appl. No.: 15/278,071

(22) Filed: Sep. 28, 2016

(65) Prior Publication Data

US 2017/0241576 A1    Aug. 24, 2017

Related U.S. Application Data

(63) Continuation of application No. 13/848,753, filed on Mar. 22, 2013, now abandoned.

(51) Int. Cl.
 *F16L 11/22* (2006.01)
 *B64D 39/00* (2006.01)
 (Continued)

(52) U.S. Cl.
 CPC ............ *F16L 11/22* (2013.01); *B60L 3/0046* (2013.01); *B60L 3/0069* (2013.01); *B60L 3/04* (2013.01);
 (Continued)

(58) Field of Classification Search
 CPC .......... B64D 39/06; B64D 39/04; F16L 11/22
 (Continued)

(56) References Cited

U.S. PATENT DOCUMENTS 482,181 A * 9/1892 Kellom .................. F16L 25/01
439/192
2,438,146 A * 3/1948 Candee .................. F16L 11/16
138/127
(Continued)

FOREIGN PATENT DOCUMENTS

EP    2289800    3/2011
FR    2714708    7/1995
(Continued)

OTHER PUBLICATIONS

Search Report from corresponding GB application No. GB1205551.3 (dated Jul. 13, 2012).
(Continued)

*Primary Examiner* — Jimmy Chou
(74) *Attorney, Agent, or Firm* — Rhodes Donahoe, LLC; Robert V. Donahoe (57) ABSTRACT

A hose is disclosed for conveying fluids. The hose has a wall defining a fluid carrying tube and a power and/or data transmission cable is integrated into said wall. Also disclosed is a user definable module that is removably attachable to the distal end of a fluid conveying hose. The hose being releasably connectable to a fluid receiving entity to provide fluid to said entity. The fluid conveying hose has a wall defining a fluid carrying tube and a power and/or data transmission cable integrated into that wall. The user definable module is connectable to the cable and has components to measure at least one measurable parameter at the end of the hose and/or provide electrical connection between the cable and said fluid receiving entity for the transmission of data and/or power along the hose via said user definable interface. Also disclosed is a method of configuring a hose for fluid transfer. The method includes the step of selecting a user definable module and attaching the selected module to
(Continued)

a distal end of the hose prior to connecting said hose to a fluid receiving entity.

20 Claims, 5 Drawing Sheets (51) Int. Cl.
| | |
|---|---|
| *F16L 11/127* | (2006.01) |
| *H01R 12/77* | (2011.01) |
| *H01R 13/00* | (2006.01) |
| *H01R 13/66* | (2006.01) |
| *B60L 3/00* | (2019.01) |
| *B60L 3/04* | (2006.01) |
| *B60L 11/18* | (2006.01) |
| *B64C 39/02* | (2006.01) |
| *B64D 39/06* | (2006.01) |

(52) U.S. Cl.
CPC ........ *B60L 11/1818* (2013.01); *B64C 39/024* (2013.01); *B64D 39/00* (2013.01); *B64D 39/06* (2013.01); *F16L 11/127* (2013.01); *H01R 12/77* (2013.01); *H01R 13/005* (2013.01); *H01R 13/6683* (2013.01); *B60L 2200/10* (2013.01); *B60L 2230/12* (2013.01); *B60L 2240/36* (2013.01); *B60L 2240/662* (2013.01); *B64C 2201/063* (2013.01); *B64C 2201/066* (2013.01); *H01R 2201/26* (2013.01); *Y02T 10/7005* (2013.01); *Y02T 10/7088* (2013.01); *Y02T 10/7291* (2013.01); *Y02T 90/121* (2013.01); *Y02T 90/14* (2013.01); *Y02T 90/16* (2013.01)

(58) Field of Classification Search
USPC .......... 174/47, 70 R, 68.1, 68.3, 72 R, 72 A, 174/88 R, 70 C; 244/135 R, 135 A, 136; 138/122, 127, 139; 392/480
See application file for complete search history.

(56) References Cited

U.S. PATENT DOCUMENTS

| | | | | |
|---|---|---|---|---|
| 2,663,523 | A * | 12/1953 | Leisy ..................... | B64D 39/00 244/135 A |
| 2,949,265 | A * | 8/1960 | Person ................... | B64D 39/04 137/615 |
| 2,973,163 | A * | 2/1961 | Goodliffe ............... | B64D 39/02 244/135 A |
| 3,023,267 | A * | 2/1962 | Eager, Jr. ............... | H01B 7/00 174/113 R |
| 3,034,085 | A * | 5/1962 | Pauler .................... | A47L 9/246 439/191 |
| 3,285,544 | A * | 11/1966 | Chope .................... | B64D 39/00 244/135 A |
| 3,780,208 | A * | 12/1973 | Whittaker .............. | F16L 11/127 174/47 |
| 4,059,847 | A * | 11/1977 | Phillips ................. | F16L 11/086 138/103 |
| 4,063,790 | A * | 12/1977 | Kleykamp ............. | A47L 9/2868 439/191 |
| 4,108,701 | A * | 8/1978 | Stanley ................. | B29C 47/023 156/160 |
| 4,129,270 | A * | 12/1978 | Robinson ............... | B64D 39/00 141/387 |
| 4,162,370 | A * | 7/1979 | Dunn ..................... | F16L 11/1185 174/47 |
| 4,167,645 | A * | 9/1979 | Carey .................... | B29C 53/785 138/122 |
| 4,196,464 | A * | 4/1980 | Russell ................. | B29C 47/0023 361/215 |
| 4,405,969 | A * | 9/1983 | Swavely ............... | F16L 11/086 174/47 |
| 4,462,649 | A * | 7/1984 | Medford ................ | F16L 33/32 174/47 |
| 4,638,114 | A * | 1/1987 | Mori ..................... | H01B 11/1839 174/108 |
| H000297 | H * | 7/1987 | Schultz ................. | 137/234.6 |
| 4,815,816 | A * | 3/1989 | Schneider ............ | A61B 1/00096 250/227.2 |
| 4,870,535 | A * | 9/1989 | Matsumoto ........... | B65G 53/52 138/103 |
| 4,964,692 | A * | 10/1990 | Prescott ................ | G02B 6/0008 362/554 |
| 5,102,012 | A * | 4/1992 | Foster ................... | B67D 7/0478 138/104 |
| 5,170,011 | A * | 12/1992 | Martucci ............... | B32B 1/08 174/47 |
| 5,220,130 | A * | 6/1993 | Walters ................. | H01B 11/1839 174/113 R |
| 5,243,128 | A * | 9/1993 | Marcoz ................. | B65H 61/00 138/104 |
| 5,428,706 | A * | 6/1995 | Lequeux ............... | F16L 53/38 392/472 |
| 5,539,624 | A * | 7/1996 | Dougherty ............ | B64D 39/00 222/113 |
| 5,573,206 | A * | 11/1996 | Ward .................... | B64D 39/00 244/1 TD |
| 5,600,752 | A * | 2/1997 | Lopatinsky ........... | A61M 16/1075 138/114 |
| 5,705,774 | A * | 1/1998 | Beauchamp .......... | H01B 7/295 174/121 A |
| 5,921,285 | A * | 7/1999 | Quigley ................ | D04C 1/06 138/114 |
| 6,061,490 | A * | 5/2000 | Sera ..................... | G02B 6/2552 385/115 |
| 6,114,632 | A * | 9/2000 | Planas, Sr. ............ | H01B 9/003 174/117 R |
| 6,441,308 | B1 * | 8/2002 | Gagnon ................ | H01B 7/295 174/105 R |
| 6,604,711 | B1 * | 8/2003 | Stevens ................ | B64C 39/024 244/135 A |
| 6,710,243 | B2 * | 3/2004 | Kao ...................... | H01B 3/441 174/113 C |
| 6,786,455 | B1 * | 9/2004 | Bartov .................. | B64D 39/00 244/135 A |
| 6,901,191 | B2 * | 5/2005 | Hurley .................. | G02B 6/441 385/109 |
| 7,097,139 | B2 * | 8/2006 | Schroeder ............. | B64D 39/00 244/135 A |
| 7,152,828 | B1 * | 12/2006 | Garcia, Jr. ............ | B64C 39/024 244/135 A |
| 7,226,302 | B2 * | 6/2007 | Walter .................. | A47L 9/246 15/377 |
| 7,516,762 | B2 * | 4/2009 | Colbachini ........... | F16L 11/112 138/121 |
| 7,637,458 | B2 * | 12/2009 | Near ..................... | B64D 39/00 244/135 A |
| 7,837,151 | B1 * | 11/2010 | Garcia, Jr. ............ | B64C 39/024 244/135 A |
| 7,887,010 | B2 * | 2/2011 | Takacs .................. | B64D 39/04 244/135 A |
| 7,891,383 | B2 * | 2/2011 | Baverel ................ | B26D 3/001 138/115 |
| 7,900,866 | B2 * | 3/2011 | Kutzmann ............ | B64C 39/024 244/1 TD |
| 8,066,033 | B2 * | 11/2011 | Quigley ................ | D04C 1/06 138/114 |
| 8,110,741 | B2 * | 2/2012 | Brotzell ................ | E21B 17/02 174/21 R |
| 8,220,746 | B1 * | 7/2012 | Stecko .................. | B64D 39/06 244/110 R |
| 8,231,083 | B2 * | 7/2012 | Kutzmann ............ | B64C 39/024 244/137.4 |
| 8,399,767 | B2 * | 3/2013 | Duquette .............. | F16L 9/147 174/650 |

(56) References Cited

U.S. PATENT DOCUMENTS

| | | | |
|---|---|---|---|
| 8,650,706 B2* | 2/2014 | Shibata | A47L 7/0085 15/323 |
| 9,150,311 B2* | 10/2015 | Rix | B64D 39/00 |
| 2002/0162674 A1* | 11/2002 | Bertini | H01B 7/2813 174/47 |
| 2004/0089639 A1* | 5/2004 | Raymond | B23K 9/323 219/121.48 |
| 2004/0097124 A1* | 5/2004 | Garrett | H01R 13/6456 439/378 |
| 2005/0060838 A1* | 3/2005 | Walter | A47L 9/246 15/414 |
| 2005/0237724 A1* | 10/2005 | Fiorentino | G06F 1/189 361/752 |
| 2006/0000950 A1* | 1/2006 | Von Thal | B64D 39/00 244/135 A |
| 2006/0011782 A1* | 1/2006 | Schroeder | B64D 39/04 244/135 A |
| 2006/0060709 A1* | 3/2006 | Thal | B64D 39/02 244/135 A |
| 2006/0137880 A1* | 6/2006 | Figenschou | E21B 17/203 166/367 |
| 2007/0144756 A1* | 6/2007 | Wenger | F16L 11/127 174/47 |
| 2008/0250632 A1* | 10/2008 | Dayton | H01B 7/40 29/825 |
| 2009/0292406 A1* | 11/2009 | Aparicio | B64D 39/00 701/3 |
| 2011/0053429 A1* | 3/2011 | Leach | H01R 13/6275 439/668 |
| 2011/0065305 A1* | 3/2011 | Amit | B60L 11/005 439/368 |
| 2012/0125683 A1* | 5/2012 | Mabuchi | B60R 16/0215 174/72 A |
| 2012/0160536 A1* | 6/2012 | Beining | F16L 25/01 174/47 |
| 2013/0037323 A1* | 2/2013 | Smith | H05B 33/02 174/75 R |
| 2013/0255986 A1 | 10/2013 | Price | |

FOREIGN PATENT DOCUMENTS

| | | |
|---|---|---|
| FR | 2129665 | 10/2007 |
| GB | 1452039 | 1/1975 |
| GB | 1488156 | 10/1977 |
| GB | 2345199 | 6/2000 |
| GB | 2443671 | 5/2008 |
| WO | 2010071643 | 6/2010 |

OTHER PUBLICATIONS

European Search Report from corresponding EP application No. 13156581.4 (dated Jul. 29, 2015).

Examination Report from corresponding GB application No. GB1205551.3 (dated Nov. 23, 2015).

* cited by examiner

HOSE FOR CONVEYING FLUID

FIELD OF THE INVENTION

This invention relates to a hose for conveying a fluid and to a method of configuring a hose for conveying a fluid.

BACKGROUND TO THE INVENTION

Flexible hoses are used to transfer fluid from one place to another and common applications are for transferring water, pressurised air, hydraulic fluid or any other fluid from one piece of equipment to another. Usually, fluid at one end of the hose is pressurised, possibly by a pump or header tank, and each end of the hose is provided with a connector that sealably connects the hose to the equipment. It is known to provide a hose for connecting one aircraft to another for the purpose of in-flight refuelling.

In-flight refuelling systems involve moving aviation fuel from a tanker aircraft to a receiving aircraft to increase the operating range and time of the receiving aircraft by overcoming the maximum fuel load limitation.

Currently, there are two main known methods of in-flight refuelling—'probe and drogue' and 'flying boom'. The probe and drogue arrangement involves a flexible hose with a valve and a drogue at the distal end of the hose. The hose is extended from the tanker aircraft and is pulled behind the tanker aircraft by the aerodynamic force created by the drogue, which also provides some positional stability. The receiving aircraft comprises a probe extending forwardly from the nose or fuselage of the aircraft, and also has a valve at its distal end. The pilot of the aircraft to be refuelled controls and manoeuvres the aircraft to align the probe with the valve and the drogue and then moves the aircraft towards the tanker aircraft so that the probe connects with the valve on the hose. Once connection has been made, the valves can be opened to establish a fluid path, thereby allowing fuel to flow into the fuel tanks of the receiving aircraft.

Flying boom refuelling systems have a rigid boom that is deployed from the tanker aircraft, the position of which is typically controlled by an operator in the tanker aircraft. The boom can carry a hose which has a valve at its distal end. The receiving aircraft comprises a docking port that may be within the fuselage, or extending from the fuselage. The pilot of the receiving aircraft again flies their aircraft into contact with the boom. However, in this case, the boom operator can control the finite position of the boom so there is a two-way process for making the connection.

Developments in aviation mean that the industry is changing to favour Unmanned Aerial Vehicles (UAV's) and Autonomous Unmanned Aerial Vehicles (AUAV's) and the refuelling requirements of these aircraft are very different to those of conventional aircraft. A limitation of UAV's and AUAV's is the power that can be carried by onboard batteries which are recharged before each use.

Aircraft currently communicate via radio or satellite communications which can place a large strain on the bandwidth of such systems. UAV's and AUAV's that are deployed as observers can collect and store large amounts of data that is either transmitted over the communication channels or stored onboard the aircraft for later retrieval. Transmission over the communication channels requires more bandwidth which means more satellites, transmitters and receivers that can add considerable cost. Furthermore, communication channels may not he fast or secure enough to carry out some operations such as system diagnostics. Storing data onboard the aircraft delays the retrieval of that information and requires the aircraft to return to the ground. Therefore, the data storage capacity of an aircraft may also limit the aircraft's maximum operational time.

SUMMARY OF THE INVENTION

The present invention seeks to provide a hose for conveying fluids that seeks to alleviate or substantially overcome the problems with conventional fluid carrying hoses, including those mentioned above.

According to the invention, there is provided a hose for conveying fluids comprising a wall defining a fluid carrying tube and a power and/or data transmission cable integrated into said wall.

In one embodiment, the wall may comprise an inner fluid carrying tube and an outer protective sheath and the cable may be positioned between the inner fluid carrying tube and the outer protective sheath.

In an alternative embodiment, the wall may comprise an inner fluid carrying tube and an outer protective sheath and the cable may be embedded within the outer protective sheath.

Advantageously, the cable may be wound around the inner fluid carrying tube to define a helical path along the hose.

Helically winding the cable around the inner fluid carrying tube means that the cable is always at an angle to any bending of the hose, thereby reducing the stress induced in the cable.

Preferably, the cable comprises a plurality of spaced insulated wires encased in a sleeve of low friction material to allow movement of the wires relative to the sleeve when the cable is subject to bending.

The low friction casing reduces the stress placed on the wires as they move around within the casing. Also, allowing the wires to move within the casing means that the wires will move to the position of least stress during bending of the hose.

Preferably, the hose has a distal end and a user definable module, the user definable module being removably attachable to said distal end and including a connector for electrical connection to said cable.

The user definable module may be tubular and may surround the distal end of the hose.

Preferably, the user definable module comprises at least one or more components for determining a measurable parameter at the distal end of the hose.

The user definable module may comprise at least one of a position sensor, an accelerometer, a temperature sensor, a pressure sensor, a proximity sensor and a flow rate sensor.

The hose may also comprise an intermediate connecting collar, attachable to the distal end of the hose proximal to the user definable module, the collar comprising first electrical terminals to connect the cable to conductors in the collar and second electrical terminals spaced from the first electrical terminals to connect the conductors in the collar to the user definable module.

The conductors in the collar may extend from the first electrical terminal in a helical path and terminate at the second electrical terminal in a plane extending substantially at right angles to a longitudinal axis of the hose.

Advantageously, the intermediate collar has an angled cut out that defines a face which is substantially perpendicular to the helical path of the cable, said first electrical terminal being mounted on said face.

The angled cut out allows the helically wound cable to easily connect to the collar without having to bend the cable.

The intermediate collar may comprise an end face which lies in a plane substantially at right angles to the longitudinal axis of the hose, said second electrical terminal being mounted to said end face.

Preferably, the user definable module comprises two half tubular portions or shells that are attachable to each other to surround the distal end of the hose.

The two part construction of the user definable module allows the user definable module to be easily removed from the hose for interchanging.

The user definable module may be attachable to the collar.

Preferably, the user definable module comprises a connector configured to connect to the second electrical terminals, when the user definable module is attached to the distal end of the hose.

A connector may extend from the distal end of the hose to receive a probe, the connector extending distally beyond the user defined module.

In one embodiment, the user definable module comprises a terminal connector configured to electrically connect to a mating terminal connector on a receiving probe, when the connector is connected to said receiving probe.

In this way, an electrical connection is made between the hose and the receiving probe which may be used for transmitting power and/or data.

According to another aspect of the invention, there is provided a user definable module removably attachable to the distal end of a fluid conveying hose that is releasably connectable to a fluid receiving entity to provide fluid to said entity, the fluid conveying hose comprising a wall defining a fluid carrying tube and a power and/or data transmission cable integrated into said wall, the user definable module being connectable to said cable and comprising components to measure at least one measurable parameter at the end of the hose and/or provide electrical connection between the cable and said fluid receiving entity for the transmission of data and/or power along said hose via said user definable interface.

According to anther aspect of the invention there is provided a method of configuring a hose for fluid transfer, said hose being releasably connectable to a fluid receiving entity to provide fluid to said entity and comprising a wall defining a fluid carrying tube and a power and/or data transmission cable integrated into said wall, the method comprising the step of selecting a user definable module according to claim 19 and attaching said selected module to a distal end of the hose prior to connecting said hose to a fluid receiving entity.

BRIEF DESCRIPTION OF THE DRAWINGS

Embodiments of the invention will now be described, by way of example only and with reference to the accompanying drawings, in which.

DETAILED DESCRIPTION OF THE DRAWINGS

Figure 1:
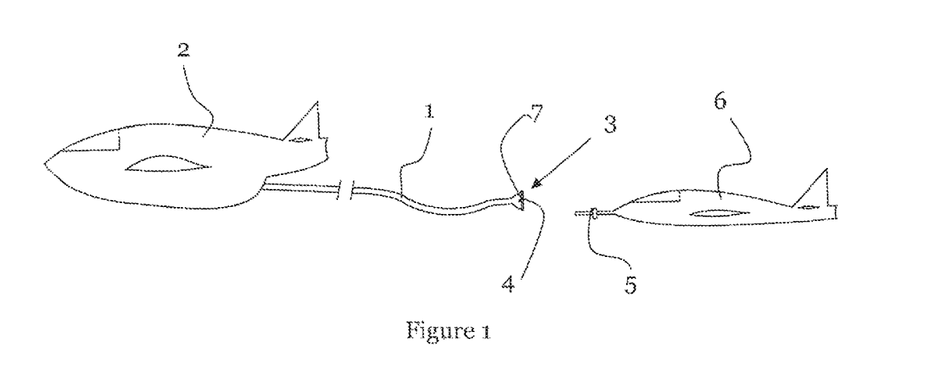
FIG. 1 shows a view of a refuelling tanker aircraft and an aircraft that is to be refuelled.

FIG. 1 shows a tanker aircraft 2 with a refuelling hose 1 in a deployed position, trailing behind the aircraft. The refuelling hose 1 is flexible and is mounted on a reel assembly within the tanker aircraft 2 so that operation of the reel assembly will deploy and retract the refuelling hose 1. The distal end 3 of the refuelling hose 1 comprises a valve connector 4 that mates with a probe 5 on the receiving aircraft 6 and a drogue 7 that provides a stabilising aerodynamic force. The drag created by the drogue 7 as the tanker aircraft 2 moves through the air provides a backwards force that drags the distal end 3 of the refuelling hose 1 behind the tanker aircraft 2 and in a position and orientation that is suitable for mating with the receiving aircraft 6. The drogue 7 also helps reduce oscillations in the hose that would otherwise cause the distal end of the refuelling hose to move around.

Figure 2:
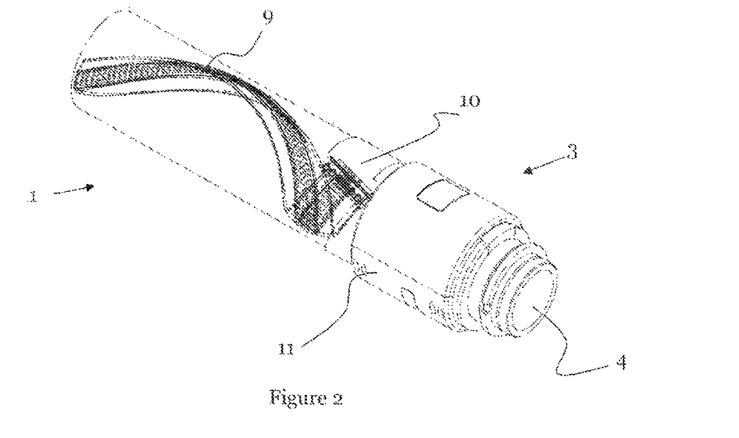
FIG. 2 shows a view of the distal end of a refuelling hose according to an embodiment of the invention.

FIG. 2 shows the distal end 3 of the refuelling hose 1 without a drogue attachment. The distal end 3 comprises a mating connector 4 that provides the sealed mechanical connection between the hose 1 and the probe of the receiving aircraft. As will be described in more detail with reference to FIGS. 2 to 8, a user definable interface (UDI) module 11 is mounted to the distal end of the refuelling hose 1 so that the connector 4 protrudes from one end of the module 11. The UDI module 11 allows a user to configure the end of the refuelling hose 1 with different functionality for different applications as will become apparent from the description that follows below. To electrically connect the UDI module 11 to the tanker aircraft, a data and/or power transmission cable 9 is wound around and embedded into the refuelling hose and terminates in an end connector 10 that connects the cable 9 to the UDI module 11 via an intermediate collar 18 (see below).

Figure 3:
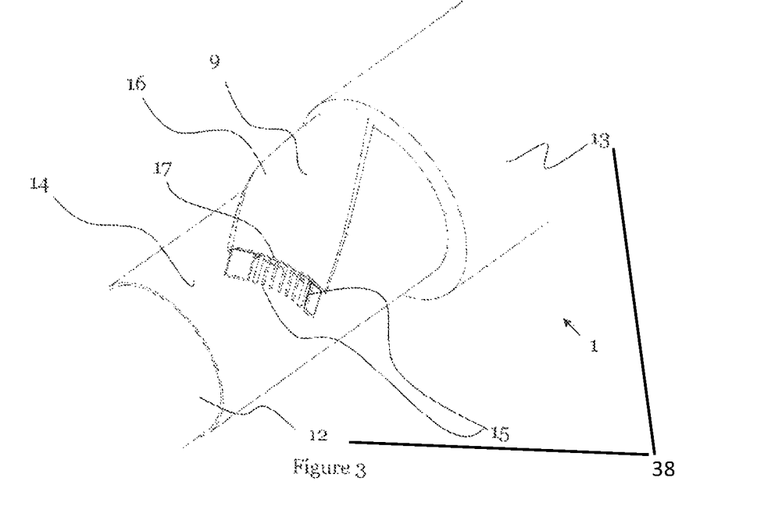
FIG. 3 shows a perspective view of the refuelling hose of FIG. 2, but omitting part of the outer protective sheath for the purposes of clarity.

FIG. 3 shows a perspective view of the refuelling hose 1 showing the cable 9 embedded within the refuelling hose 1. The hose 1 comprises an inner fuel carrying hose 12 and an outer protective sheath 13 as well as a reinforcing sheath 14 that provides both increased strength and protection against electrical charges such as lightning strikes (part of the outer protective sheath 13 is removed in FIG. 3 for clarity and to enable the path of the cable 9 to be seen). The cable 9 is flat and flexible and comprises a plurality of conducting wires 15 to carry power, data or any other electrical signals. The cable 9 is wrapped helically around the inner fuel carrying hose 12 and the reinforcing sheath 14 and is then covered by the outer protective sheath 13 so that the cable 9 is located between the reinforcing sheath 14 and the outer protective sheath 13. According to one embodiment, a wall 38 may comprise the inner fluid carrying hose 12 and the outer protective sheath 13 and the cable 9 may be positioned between the inner fluid carrying hose 12 and the outer protective sheath 13. Alternatively, the cable 9 may be embedded within the outer protective sheath 13. The wires 15 themselves may be of any type, for example 4 AWG wires for carrying power, wires for carrying data and/or power and/or fibre optic cables. The wires 15 may be copper, aluminium or optical wave guides or other suitable conductors. The cable 9 should be configured to carry both power and/or data signals with a degree of flexibility so that the hose 1 and cable 9 can he used with a variety of UDI modules, as explained in more detail hereinafter.

During normal duty the flexible hose 1 is exposed to bending forces caused by winding the hose 1 on and off a storage reel on the tanker aircraft and also from turbulence during operation, as the hose moves around in the air. The cable 9 is embedded within the hose 1 so will also be subject to those bending forces and there is a need to protect the cable 9, particularly the wires 15, from fatigue stresses. Bending the hose 1 and the cable 9 will exert tensile stress on one side of the wires 15 and compressive stress on the opposite side. Also, the direction of bending will change during operation, resulting in fatigue stress effects. The bending and fatigue stresses can alter the conductive properties of the wires 15 and affect the performance of the cable 9, possibly even causing the wires 15 to fail.

Helically winding the cable 9 along the length of the hose reduces the stress in the wires 15 during operation because the wires 15 are always at an angle to the bending direction of the hose 1. Furthermore, each wire is provided with low friction insulation, made from a fluoropolymer or thermoplastic material, and the insulated wires 15 are contained within a low friction sleeve 17, also made from a fluoropolymer or thermoplastic material. This allows the insulated wires 15 to move around within the sleeve 17. The low friction contact between the insulated wires 15 and the sleeve 17 allows the wires 15 to move around within the sleeve 17 to the position of least stress as the hose 1 bends, thereby reducing the bending and fatigue stresses induced in the power, signal and fibre optic wires 15. The outer surface of the sleeve 17 is treated to allow it to be bonded to the outer protective sheath 13 or reinforcing sheath 14 of the hose 1. The treatment process could be chemical etching, plasma arc or bespoke RF surface modification that allows adhesive to bond to the sleeve 17.

In addition to stress protection, the cable 9 is fully sheathed in a protective layer 16 to protect the cable 9 and the systems attached to the cable from an Electromagnetic Impulse (EMI). An EMI may occur naturally, such as from a lightning strike or as a result of the systems themselves, for example a build up of static electricity or short circuits. Alternatively, EMI may be used intentionally as weapon and the systems of the aircraft and the refuelling apparatus need to be protected from any such attack.

Figure 4:
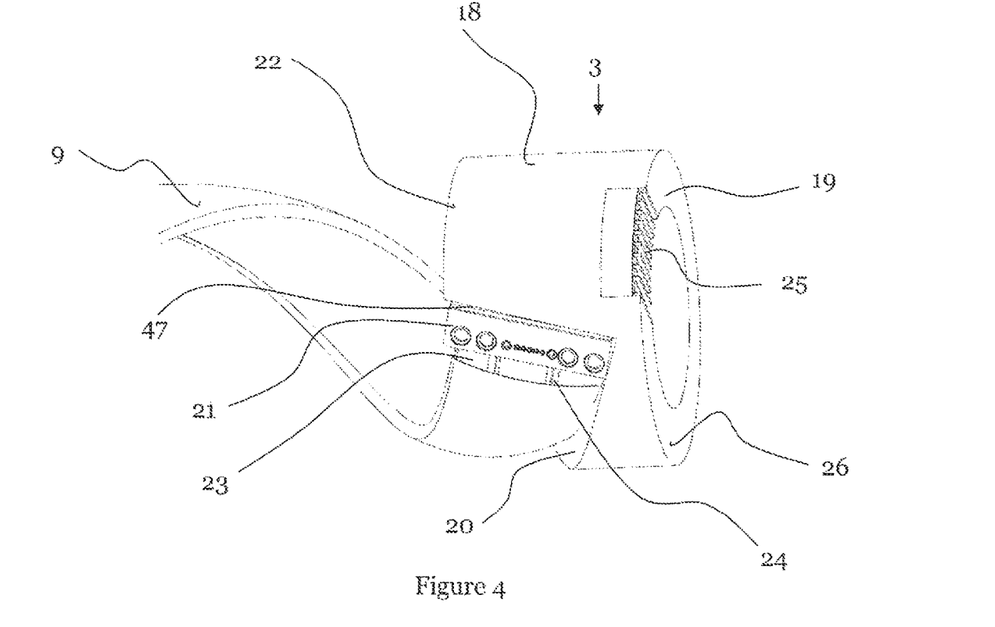
FIG. 4 shows a view of the termination collar and electrical connector of FIG. 2.
Figure 5:
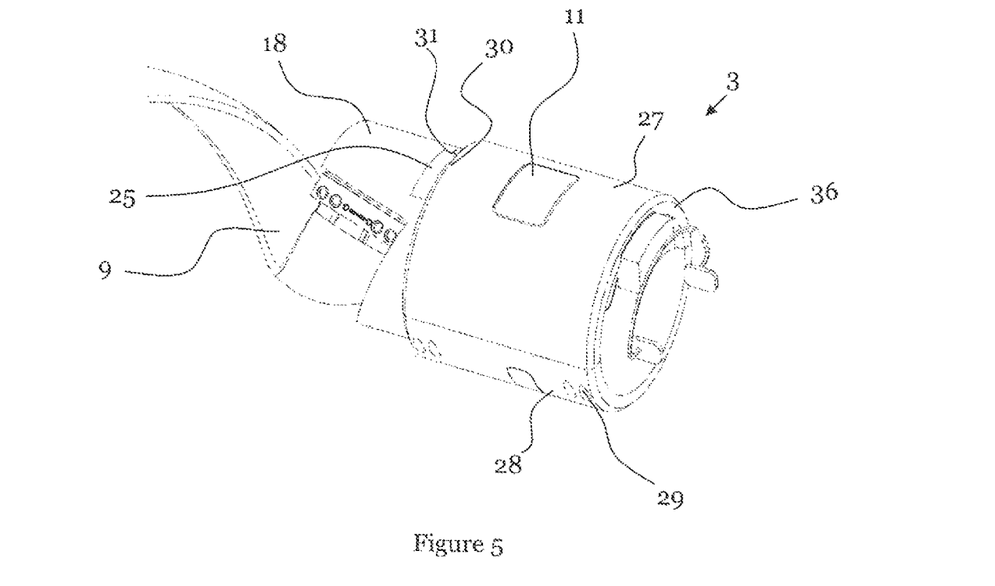
FIG. 5 shows a view of the user definable interface module (UDI) for attachment to the refuelling hose.

FIG. 4 shows a termination collar 18 that is fixed to the distal end of the refuelling hose to provide an electrical terminal and connection between the cable 9 and the UDI module 11 (see FIG. 5). The termination collar 18 is attached to the outer protective sheath 13 (see FIG. 3) of the refuelling hose 1 to securely and rigidly attach the termination collar 18 to the hose 1. The termination collar 18 comprises a ring portion 19 with an inner diameter that is larger than and extends around the inner refuelling hose 12 and the mechanical connector 4 without interfering with the function of these components.

As shown in FIG. 4 the termination collar 18 comprises an angled cut out 20 at the end of the termination collar 18 facing along the hose 1 towards the tanker aircraft. The cut out has a face 47 that extends perpendicularly to the helix path of the cable 9 such that the face 47 is at 90 degrees relative to the helix angle of the cable 9. The face 47 comprises an electrical connector 21 configured to receive the end 23 of the helically wound cable 9 and the sleeve 17 is adhered or bonded to the termination collar 18. The angled cut out 20 and the face 47 allow the end 23 of the cable 9 to be easily received in the connector 21 without having to flex the cable 9 or disturb the helical path. The angled cut out 20 extends from the face 47 at an angle that is closely matched to the helix angle of the cable 9 so that the termination collar 18 is shaped to allow the cable 9 to freely connect with the connector 21. The end 23 of the cable 9 may be removably or permanently attached to the connector 21 on the termination collar 18. The connector 21 may be a zero insertion force type connector with a clamping element to prevent disconnection. Conductors 24 are embedded within the ring portion 19 of the termination collar 18 to connect the electrical connector 21 on angled face 47 to an electrical terminal 25 on the distal end 26 of the termination collar 18, facing away from the tanker aircraft. The conductors 24 initially follow the helical path through the collar 18 but then turn so that they extend in an axial direction of the hose and terminate at the end face of the collar 18, which lies in a plane extending at right-angles to the longitudinal axis of the hose. The conductors 24 may be copper, aluminium or optical wave guides. In this way, when the cable 9 is attached to the electrical connector 21, the cable 9 is in electrical contact with the terminal 25 on the end face 26 of the termination collar 18, so that electrical connection can then be made to the UDI module 11, as explained below with reference to FIG. 5.

FIG. 5 shows the distal end 3 of the refuelling hose 1 with the cable 9, termination collar 18 and the User Definable Interface (UDI) module 11 attached to the termination collar 18. The UDI module 11 and collar 18 are shown as being partially transparent for the purposes of clarity only. The UDI module 11 comprises two half-cylindrical portions or shells 27, 28 that are attachable to each other surrounding the refuelling hose 1. The UDI module 11 may also be attachable to the end 26 of the termination collar 18.

The two parts 27, 28 of the UDI module 11 may be attachable to each other by a magnetic clamping system comprising a plurality of magnets, such as neodymium magnets, embedded in the mating faces of the two parts 27, 28. The magnets in each part 27, 28 have opposing poles such that they attract each other and clamp the two parts 27, 28 together. The magnets in one of the two parts 27, 28 are moveable so that the magnets can be moved from an aligned position for clamping to an unaligned positioned for separating the two parts 27, 28 of the UDI module 11. The magnets may be moveable by a manual lever or other actuator. Alternatively, the two parts 27, 28 of the UDI module are attachable by means of locking elements, fasteners, or any other suitable attachment that allows the UDI module 11 to be easily clamped and separated. Similarly, the UDI module 11 may also be attached to the outer face 26 of the termination collar 18 by any of the attachment means described above.

The UDI module 11 is easily removable from the refuelling hose 1 and can be changed during flight when the hose is retracted into the tanker aircraft 2. Different UDI modules 11 may be configured in different ways for different applications, for example refuelling of different aircraft or in different conditions.

The UDI module 11 comprises an electrical connector 30 on the end face 31 of one of the half-cylindrical portions 27 that connects with the electrical terminal 25 on the end face 26 of the termination collar 18 to electrically connect the termination collar 18 to the UDI module 11. Conductors or wires 32 are embedded into, or mounted to, the UDI module 11 to connect any devices that are mounted in the UDI module 11 to the connector 30 and therefore to the tanker aircraft 2 via the cable 9. Some examples of components that the UDI module 11 may comprise are position sensors, accelerometers, pressure, temperature, flow rate sensors, connection sensors (to detect if the probe and hose are suitably mated) and so forth. The UDI module 11 is able to provide whatever functionality is required for each individual refuelling aircraft, or even each individual operation. The cable 9 provides the connectivity and the UDI module provides a platform for using any type of electrical equipment desired at the connection between the refuelling hose and the receiving aircraft.

Figure 6A:
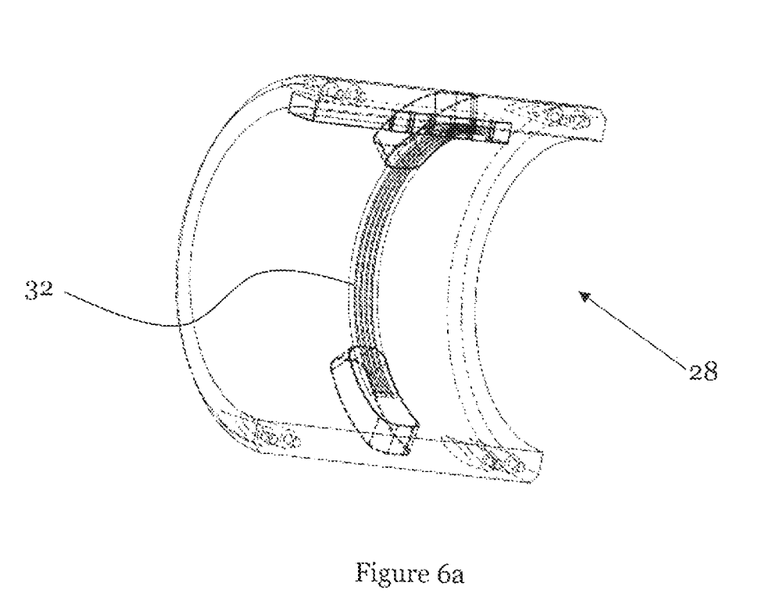
FIGS. 6a and 6b show views of the two portions of the UDI module.
Figure 6B:
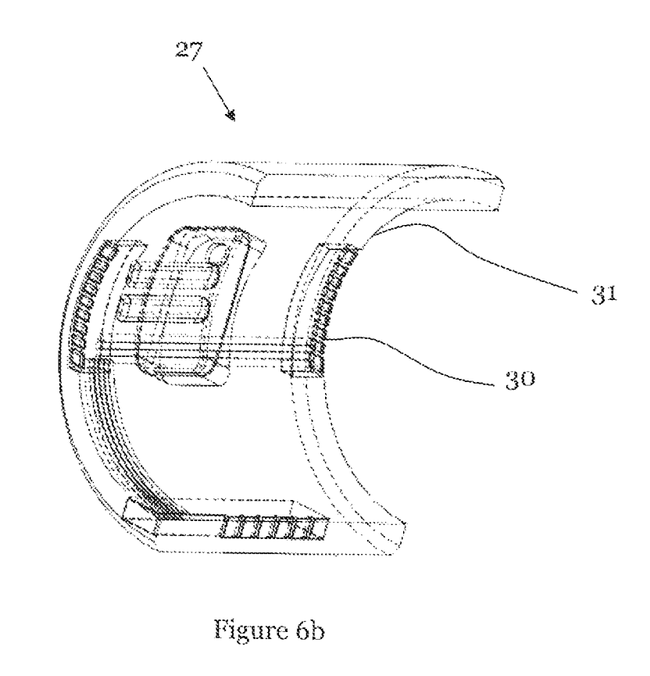

FIGS. 6a and 6b show the two portions 27, 28 of the UDI module 11 that are attachable to each other and to the end 26 of the termination collar 18. As explained above, the UDI module 11 is fully configurable to change the connectivity and function of the refuelling hose 1 depending on the requirements of the user and the operation. Components such as sensors and connectors can be embedded within or attached to the UDI modules 11 and different UDI modules 11 can be provided for different applications. Each different UDI module 11 may utilise the wires 15 in the cable 9 differently so different connections will be required at the tanker end of the cable 9 as well. Before or between refuelling operations a user onboard the tanker aircraft 2 may change the UDI module 11 by removing the two portions 27, 28 and swapping them for a different UDI module 11, thereby changing the functionality and capabilities of the refuelling hose 1.

Figure 7:
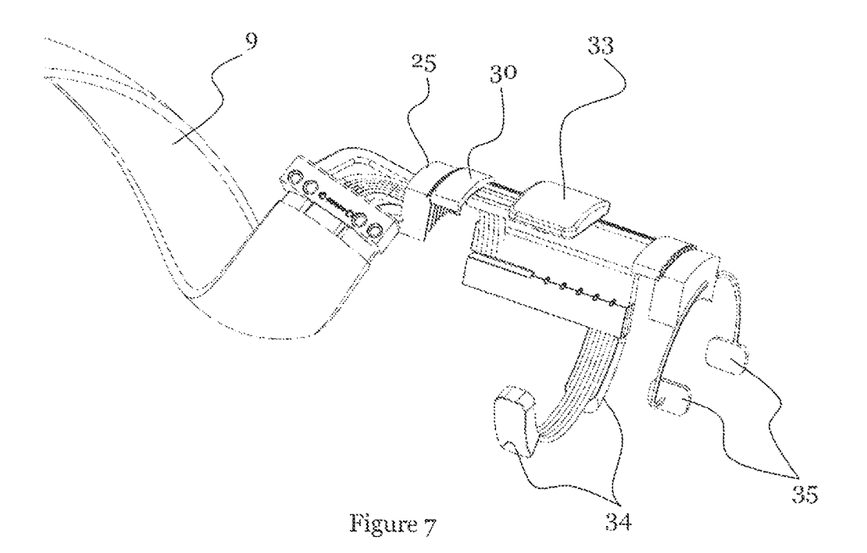
FIG. 7 shows a view of an example configuration of the UDI module with the casing portions removed for clarity.

FIG. 7 shows an example configuration of the UDI module 11 without the body of the UDI module 11 showing, for purposes of clarity. In this case, the UDI module 11 comprises a power transfer unit 33, accelerometers 34 and heat and pressure sensors 35. The power transfer unit 33 is positioned on an outer face of the UDI module 11 and power is provided to the unit from the tanker aircraft 2 along the cable 9 in the refuelling hose 1. The receiving aircraft 2 will have a similar power transfer unit positioned on or near the probe 5 that connects with the refuelling hose 1 so that when the probe and the hose are connected, the two power transfer units are proximate to each other and power can be transferred from one aircraft to the other via induction. The accelerometers 34 can be used to determine the position and/or stability of the distal end 3 of the refuelling hose 1 which may be useful for informing the operators or systems about the condition of the connection or if the hose 1 is stable enough for a connection to be made in the first place. For example, high acceleration during fuel transfer may trigger the fuel transfer operation to be stopped as a safety precaution. Temperature and pressure sensors 35 in the UDI module 11 can inform operators or systems about the state of the fuel being transferred and therefore if the systems are working effectively or if there might be a blockage or other problem. Low or high temperatures caused by the high altitudes or malfunctioning systems may be dangerous so temperature sensors may be used to determine if fuel transfer is safe and inform an operator or system when the fuel temperature is outside a safe range.

A further optional component for the UDI module 11 may include providing an electrical terminal (not shown) at the distal end 36 (see FIG. 5) of the UDI module 11 that is configured to electrically connect to a connector on the receiving aircraft 6 when the refuelling connection is made. The receiving aircraft may comprise an electrical connector assembly either on, or near, the probe 5 that connects to the UDI module, allowing power and/or data to be transferred between the tanker aircraft 2 and the receiving aircraft 6 via the cable 9 in the refuelling hose 1. The connectors may magnetically orientate and/or lock together to ensure alignment before a connection is made. Alternatively, concentric slip rings may be used on the distal end of the UDI module that connect to a compatible slip ring arrangement on the receiving aircraft.

The electrical connection along the hose 1 allows power and/or electrical signals to be carried from the tanker aircraft 2 to the receiving aircraft 6 and vice versa. Therefore, it is possible to provide power to the aircraft 6 being refuelled to recharge the batteries and extend the operating life of UAV's and AUAV's which carry limited life batteries. Furthermore, the tanker aircraft 2 is able to securely communicate with the receiving aircraft 6 to download data, such as surveillance images, or to upload instructions or perform diagnostic analysis on faulty or out of date systems. The data connection is more secure than a wireless alternative because it is direct, can not be intercepted and is protected from EMI and other such attacks.

Furthermore, the UDI module 11 may be fitted with a drogue that functions in the conventional manner. Alternatively, the UDI module 11 may have aerodynamic control surfaces and an actuator to control the wings from the tanker aircraft 2 such that an operator onboard the tanker aircraft may control the attitude of the distal end of the refuelling hose 1 to facilitate the connection between the probe 5 and the distal end 3 of the hose 1. Again, the UDI module 11 is changeable so a tanker aircraft will be able to switch between these applications during flight, depending on the requirements of each refuelling operation and the equipment onboard the receiving aircraft.

The components, systems and methods described herein are applicable to any in-flight refuelling system including, but not limited to, 'manned tanker to manned aircraft', 'manned tanker to unmanned aircraft' and 'unmanned tanker to unmanned aircraft'. Furthermore, it will be appreciated that the invention as defined in the claims is applicable to other similar applications where a transfer of fluid is required from one moveable place to another. For example, ship-to-ship or ship-to-helicopter fluid transfer, or connections between oil and gas exploration and production equipment both on land and subsea.

The invention claimed is:

1. A refuelling hose for air-to-air refuelling, the refuelling hose comprising:
   a wall defining a fuel carrying tube and a power and/or data transmission cable integrated into said wall,
   wherein the wall comprises an inner fuel carrying tube and an outer protective sheath, wherein the power and/or data transmission cable is positioned between the inner fuel carrying tube and the outer protective sheath,
   wherein the power and/or data transmission cable is wound around the inner fuel carrying tube to define a helical path along the refuelling hose,
   wherein the power and/or data transmission cable comprises a plurality of spaced insulated wires encased in a sleeve of low friction material to allow movement of the plurality of spaced insulated wires relative to the sleeve when the power and/or data transmission cable is subject to bending, and
   wherein the refuelling hose further comprises an intermediate connecting collar attachable to a distal end of the refuelling hose, the intermediate connecting collar comprising first electrical terminals to connect the power and/or data transmission cable to conductors in the intermediate connecting collar, and second electrical terminals to connect the conductors to a user definable module that can be removably attached to the refuelling hose via the intermediate connecting collar.

2. The refuelling hose of claim 1, wherein the refuelling hose has a distal end, the user definable module being removably attachable to said distal end via the intermediate connecting collar and including a connector for electrical connection to said power and/or data transmission cable.

3. The refuelling hose of claim 2, wherein the user definable module is tubular and surrounds the distal end of the refuelling hose.

4. The refuelling hose of claim 2, wherein the user definable module comprises at least one or more components for determining a measurable parameter at the distal end of the refuelling hose.

5. The refuelling hose of claim 4, wherein the user definable module comprises at least one of a position sensor, an accelerometer, a temperature sensor, a pressure sensor, a proximity sensor and a flow rate sensor.

6. The refuelling hose of claim 2, wherein the conductors in the intermediate connecting collar extend from the first electrical terminals in a helical path and terminate at the second electrical terminals in a plane extending substantially at right angles to a longitudinal axis of the hose.

7. The refuelling hose of claim 6, wherein the intermediate connecting collar has an angled cut out that defines a face which is substantially perpendicular to the helical path of the cable, said first electrical terminals being mounted on said face.

8. The refuelling hose of claim 6, wherein the intermediate connecting collar comprises an end face which lies in a plane substantially at right angles to the longitudinal axis of the refuelling hose, said second electrical terminals being mounted to said end face.

9. The refuelling hose of claim 2, wherein the user definable module comprises two half tubular portions or shells that are attachable to each other to surround the distal end of the refuelling hose.

10. The refuelling hose of claim 9, wherein the user definable module is attachable to the intermediate connecting collar.

11. The refuelling hose of claim 2, wherein a terminal connector extends from the distal end of the refuelling hose to receive a probe, the terminal connector extending distally beyond the user defined module.

12. The refuelling hose of claim 11, wherein the user definable module includes the terminal connector, the terminal connector configured to electrically connect to a mating terminal connector on a receiving probe, when the refuelling hose receives the probe.

13. The refuelling hose of claim 1, wherein the power and/or data transmission cable is flat and flexible.

14. The refuelling hose of claim 13, wherein the plurality of spaced insulated wires are arranged side-by-side within the power and/or data transmission cable.

15. The refuelling hose of claim 14, wherein the plurality of spaced insulated wires are individually insulated in a low friction material.

16. The refuelling hose of claim 15, wherein the low friction material individually insulating the plurality of spaced insulated wires comprises fluoropolymer or thermoplastic material.

17. The refuelling hose of claim 1, wherein the low friction material of the sleeve comprises fluoropolymer or thermoplastic material.

18. The refuelling hose of claim 17, wherein an outer surface of the sleeve is bonded to the outer protective sheath.

19. The refuelling hose of claim 18, wherein the outer surface of the sleeve is treated to increase the strength of the bonding between the outer surface of the sleeve and the outer protective sheath.

20. A refuelling hose for air-to-air refuelling, the refuelling hose comprising:
   a wall defining a fuel carrying tube and a power and/or data transmission cable integrated into said wall;
   a distal end and a user definable module, the user definable module including a connector for electrical connection to said power and/or data transmission cable; and
   an intermediate connecting collar, attachable to the distal end of the hose proximal to the user definable module, the intermediate connecting collar comprising first electrical terminals to connect the cable to conductors in the intermediate connecting collar and second electrical terminals spaced from the first electrical terminals to connect the conductors in the intermediate connecting collar to the user definable module,
   wherein the user definable module is removably attachable to the distal end via the intermediate connecting collar,
   wherein the wall comprises an inner fuel carrying tube and an outer protective sheath, wherein the power and/or data transmission cable is positioned between the inner fuel carrying tube and the outer protective sheath,
   wherein the power and/or data transmission cable is wound around the inner fuel carrying tube to define a helical path along the hose, and
   wherein the power and/or data transmission cable comprises a plurality of spaced insulated wires encased in a sleeve of low friction material to allow movement of the wires relative to the sleeve when the cable is subject to bending.

* * * * *